(12) United States Patent (10) Patent No.: US 12,570,867 B2
Funakoshi (45) Date of Patent: Mar. 10, 2026

(54) INKJET INK SET, INKJET RECORDING APPARATUS, AND INKJET RECORDING METHOD

(71) Applicant: KYOCERA Document Solutions Inc., Osaka (JP)

(72) Inventor: Daichi Funakoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 147 days.

(21) Appl. No.: 18/404,475

(22) Filed: Jan. 4, 2024

(65) Prior Publication Data

US 2024/0228810 A1 Jul. 11, 2024

(30) Foreign Application Priority Data

Jan. 11, 2023 (JP) ................................. 2023-002040

(51) Int. Cl.
*C09D 11/40* (2014.01)
*B41J 3/54* (2006.01)
*C09D 11/322* (2014.01)
(52) U.S. Cl.
CPC ............... *C09D 11/40* (2013.01); *B41J 3/543* (2013.01); *C09D 11/322* (2013.01)

(58) Field of Classification Search
CPC ...................................................... B41J 2/2117
See application file for complete search history.

(56) References Cited

U.S. PATENT DOCUMENTS

| | | | |
|---|---|---|---|
| 10,190,011 B2 | 1/2019 | Ohta | |
| 2006/0155005 A1* | 7/2006 | Kondo | C09D 11/101 427/466 |
| 2018/0030300 A1 | 2/2018 | Ohta | |
| 2020/0023648 A1* | 1/2020 | Gotou | B41J 2/145 |
| 2020/0224048 A1* | 7/2020 | Furukawa | B41J 2/01 |

FOREIGN PATENT DOCUMENTS

| | | |
|---|---|---|
| JP | 2018-015968 A | 2/2018 |

* cited by examiner

*Primary Examiner* — Shelby L Fidler
(74) *Attorney, Agent, or Firm* — Studebaker Brackett PLLC

(57) ABSTRACT

An inkjet ink set includes a first ink and a second ink. The first ink contains first pigment particles, a first binder, and a first aqueous medium. The second ink contains second pigment particles, a second binder, and a second aqueous medium. The first pigment particles each include a titanium pigment particle in a flat shape. The first binder has a Young's modulus of at least 600 N/mm$^2$ and no greater than 1600 N/mm$^2$.

19 Claims, 3 Drawing Sheets

INKJET INK SET, INKJET RECORDING APPARATUS, AND INKJET RECORDING METHOD

INCORPORATION BY REFERENCE

The present application claims priority under 35 U.S.C. § 119 to Japanese Patent Application No. 2023-002040, filed on Jan. 11, 2023. The contents of this application are incorporated herein by reference in their entirety.

BACKGROUND

The present disclosure relates to an inkjet ink set, an inkjet recording apparatus, and an inkjet recording method.

Non-absorbent recording media that do not absorb or hardly absorb water may be used in label printing and package printing. Various inks for image printing on the non-absorbent recording media are studied. For example, some inkjet recording method includes: forming a first image layer by ejecting a first ink composition by ink jetting; drying; and forming a second image layer by ejecting a second ink composition by ink jetting. The first ink composition and the second ink composition each contain an organic solvent with a standard boiling point of over 250° C. in an amount of no greater than 2% by mass.

SUMMARY

An inkjet ink set according to an aspect of the present disclosure includes a first ink and a second ink. The first ink contains first pigment particles, a first binder, and a first aqueous medium. The second ink contains second pigment particles, a second binder, and a second aqueous medium. The first pigment particles each include a titanium pigment particle in a flat shape. The first binder has a Young's modulus of at least 600 N/mm² and no greater than 1600 N/mm².

An inkjet recording apparatus according to another aspect of the present disclosure includes a first ink, a second ink, a first recording head that ejects the first ink toward a recording medium, and a second recording head that ejects the second ink toward at least a part of an area of the recording medium where the first ink has been ejected. The first ink contains first pigment particles, a first binder, and a first aqueous medium. The second ink contains second pigment particles, a second binder, and a second aqueous medium. The first pigment particle each include a titanium pigment particle in a flat shape. The first binder has a Young's modulus of at least 600 N/mm² and no greater than 1600 N/mm². The recording medium is a non-absorbent recording medium.

An inkjet recording method according to another aspect of the present disclosure includes: ejecting a first ink toward a recording medium; and ejecting a second ink toward at least a part of an area of the recording medium where the first ink has been ejected. The first ink contains first pigment particles, a first binder, and a first aqueous medium. The second ink contains second pigment particles, a second binder, and a second aqueous medium. The first pigment particles each include a titanium pigment particle in a flat shape. The first binder has a Young's modulus of at least 600 N/mm² and no greater than 1600 N/mm². The recording medium is a non-absorbent recording medium.

DETAILED DESCRIPTION

Figure 1:
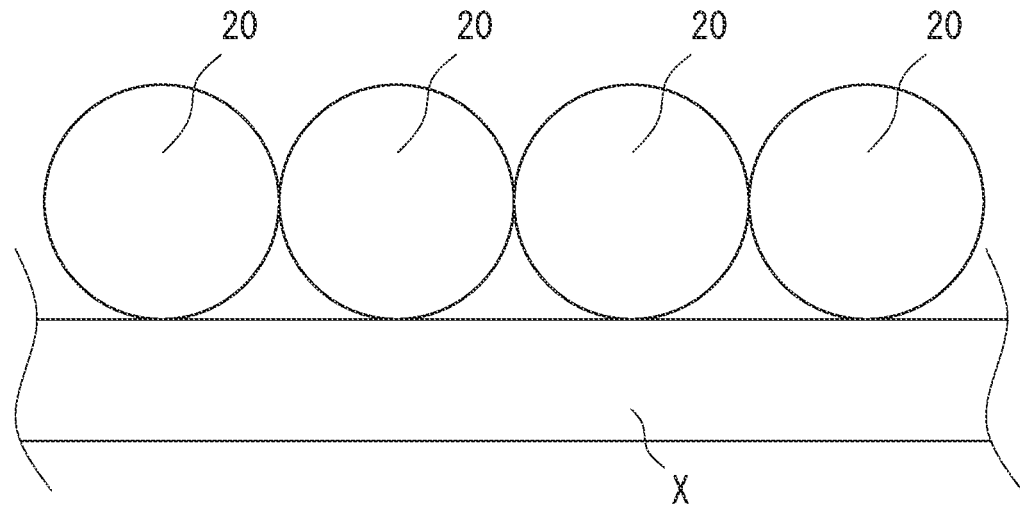
FIG. 1 is a diagram illustrating a state in which spherical titanium pigment particles in a comparative example have landed on a recording medium.

The terms described in the present specification are explained first. In the following, the term "(meth)acryl" is used as a generic term for both acryl and methacryl. The glass transition point is a value as measured using a dynamic viscoelasticity measuring device (e.g., "RHEOGEL-E4000", product of UBM Inc.) unless otherwise stated. The heat softening temperature and the thermal melting temperature are values as measured using a capillary rheometer (e.g., "CFT-500D", product of SHIMADZU CORPORATION) unless otherwise stated. In measurement using the capillary rheometer, the outflow start temperature is defined as the heat softening temperature and the ½ method temperature is defined as the thermal melting temperature. The volume median diameter is a value ($D_{50}$) at cumulative 50% in a particle size distribution in terms of volume. The volume median diameter is a value as measured using a dynamic light scattering type particle size distribution analyzer (e.g., "ZETASIZER (registered Japanese trademark) NANO ZS", product of Malvern Instruments Ltd.) unless otherwise stated. One type of each component described in the present specification may be used independently, or two or more types of the component may be used in combination. The terms described in the present specification have been explained so far.

First Embodiment: Inkjet Ink Set

An inkjet ink set (also referred to below as an ink set) according to a first embodiment of the present disclosure includes a first ink and a second ink. The first ink and the second ink are accommodated in containers different from each other, for example. Preferably, the first ink is used for background image printing on recording media and the second ink is used for printing images on the background images. That is, it is preferable that the first ink is an ink for printing background images and the second ink is an ink to be ejected toward background images.

The first ink and the second ink included in the ink set of the first embodiment are especially suitably used in printing on non-absorbent recording media. Unlike absorbent recording media that absorb water, such as paper, each of the non-absorbent recording media is a recording medium that does not absorb or hardly absorbs water. Examples of the non-absorbent recording medium include foil paper, overhead projector (OHP) sheets, and plastic recording media. The plastic recording media have a sheet shape or a film shape. Examples of the plastic recording media include polyester (e.g., PET) recording media, polypropylene recording media, polystyrene recording media, and polyvinyl chloride recording media. Either or both sides of the non-absorbent recording medium may not be surface-treated. Alternatively, one or both sides of the non-absorbent recording medium may be surface-treated. Examples of the surface treatment include corona discharge treatment, plasma treatment, and primer treatment.

Here, the ink set of the first embodiment have the following features. The first ink included in the ink set of the first embodiment contains first pigment particles, a first binder, and a first aqueous medium. The second ink included in the ink set of the first embodiment contains second pigment particles, a second binder, and a second aqueous medium. The first pigment particles include titanium pigments (also referred to below as "flat titanium pigment particles") in a flat shape. The first binder has a Young's modulus of at least 600 N/mm$^2$ and no greater than 1600 N/mm$^2$. As a result of having the above features, the ink set of the first embodiment can print constant line width images with excellent scratch resistance on the non-absorbent recording medium. The reasons for this are surmised to be as follows.

Figure 2:
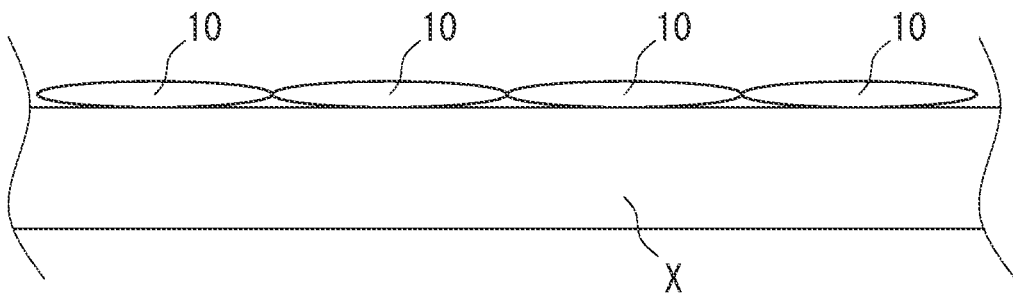
FIG. 2 is a diagram illustrating a state in which titanium pigment particles in a flat shape in a first embodiment of the present disclosure have landed on the recording medium.

With reference to FIGS. 1 and 2, a reason is described why the ink set of the first embodiment can form constant line width images on the non-absorbent recording medium. FIG. 1 is a diagram illustrating a state in which spherical titanium pigment particles 20 have landed on a recording medium X in a comparative example outside the scope of the present disclosure. FIG. 2 is a diagram illustrating a state in which flat titanium pigment particles 10 have landed on the recording medium X in the first embodiment within the scope of the present disclosure.

When the first ink (e.g., an ink for printing background images) containing the spherical titanium pigment particles 20 is ejected from a recording head included in an inkjet recording apparatus, a dried coating film (e.g., a background image) of the first ink constituted by the spherical titanium pigment particles 20 is formed on the recording medium X as illustrated in FIG. 1. Due to the spherical titanium pigment particles 20 having a spherical shape, the degree of unevenness of the background surface is large. If the second ink is ejected onto the background surface with a large degree of unevenness, the second ink will flow into the recesses of the background surface and not spread evenly. As such, when printing a fine line image with the second ink, a constant line width image cannot be formed. The second ink containing an aqueous medium is not absorbed in the non-absorbent recording medium and readily stays on the surface of the non-absorbent recording medium. Therefore, a problem with the second ink not wet-spreading evenly is significant particularly in a case in which the recording medium X is a non-absorbent recording medium.

By contrast, in the ink set of the first embodiment, the first ink (e.g., an ink for printing background images) containing the flat titanium pigment particles 10 is ejected from the recording head included in the inkjet recording apparatus as illustrated in FIG. 2. Thus, a dried coating film (e.g., a background image) of the first ink constituted by the flat titanium pigment particles 10 is formed on the recording medium X. Due to the flat titanium pigment particles 10 having a flat shape, the degree of unevenness of the background surface is small and the background surface becomes smooth. The second ink ejected onto the smooth background can wet-spread evenly. As such, when printing fine line images with the second ink, constant line width images can be favorably formed. The reason has been described so far why the ink set of the first embodiment can form constant line width images with reference to FIGS. 1 and 2.

Subsequently, a reason is described why the ink set of the first embodiment can print images with excellent scratch resistance on the non-absorbent recording medium. The Young's modulus of the first binder is relatively high, at least 600 N/mm$^2$ and no greater than 1600 N/mm$^2$, in the ink set of the first embodiment. The first binder (binding agent), which has a higher Young's modulus, has a higher rigidity, so the first ink firmly bonds to the non-absorbent recording medium. As a result, scratch resistance of the first ink to the non-absorbent recording medium increases, thereby achieving printing of images with excellent scratch resistance. The reason has been described so far why the ink set of the first embodiment can print images with excellent scratch resistance on the non-absorbent recording medium. The components of the first ink and the second ink are described below.

<Pigment Particles>

The first ink contains many first pigment particles, while the second ink contains many second pigment particles. In the first ink, the first pigment particles each include at least a flat titanium pigment particle. Each of the first pigment particles may further include a coat layer covering the flat titanium pigment particle. That is, it is preferable that the first pigment particles in the first ink each include a flat titanium pigment particle (corresponding to a core) constituted by a titanium pigment and a coat layer covering the core. Furthermore, each of the second pigment particles in the second ink preferably includes a core constituted by a pigment and a coat layer covering the core. The coat layers are constituted by a pigment coating resin in each of the first ink and the second ink. At least a portion of the pigment coating resin covers the cores. However, another portion of the pigment coating resin may be dissolved or dispersed in the corresponding aqueous medium without covering the cores.

In terms of optimizing color density, hue, and stability of the first ink, the first pigment particles have a volume median diameter of preferably at least 50 nm and no greater than 500 nm, and more preferably at least 100 nm and no greater than 400 nm. In terms of optimizing color density, hue, and stability of the second ink, the second pigment particles have a volume median diameter of preferably at least 30 nm and no greater than 200 nm, and more preferably at least 70 nm and no greater than 130 nm.

(First Pigment Particles)

As described previously, the first pigment particles each include a flat titanium pigment particle (i.e., a titanium pigment particle with a flat shape).

Figure 3:
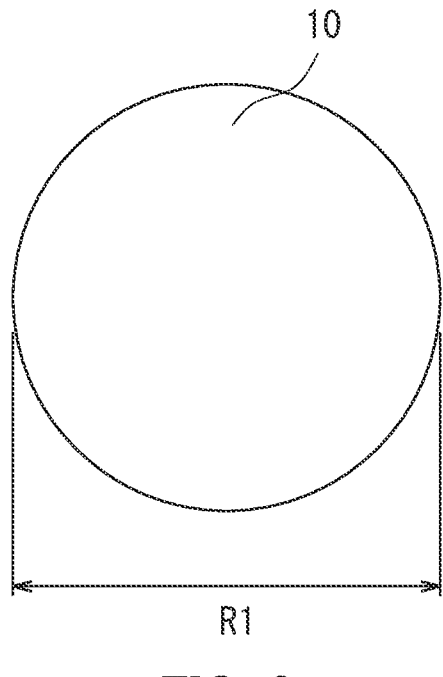
FIG. 3 is a plan view of a titanium pigment particle in a flat shape contained in a first ink of an inkjet ink set of the first embodiment of the present disclosure.
Figure 4:
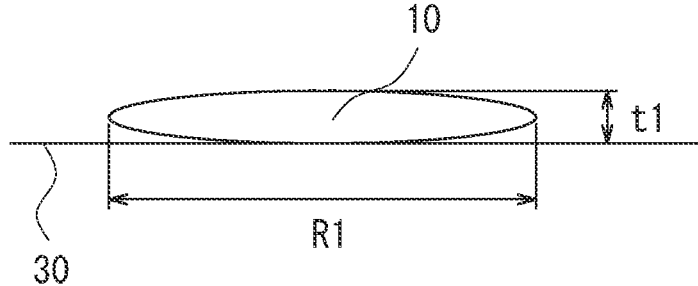
FIG. 4 is a side view of the titanium pigment particle in a flat shape contained in the first ink of the inkjet ink set of the first embodiment of the present disclosure.

With reference to FIGS. 3 and 4, the flat shape of the titanium pigment particles is described below. FIG. 3 is a plan view of a flat titanium pigment particle 10 contained in the first ink included in the ink set of the first embodiment. FIG. 4 is a side view of the flat titanium pigment particle 10 contained in the first ink included in the ink set of the first embodiment. As illustrated in FIG. 3, the flat titanium pigment particle 10 has a maximum diameter R1. As illustrated in FIG. 4, the flat titanium pigment particle 10 has the maximum diameter R1 and a thickness t1 in a state in which it is placed on a flat surface 30. As illustrated in FIG. 4, the flat titanium pigment particle 10 has a shape with a relatively small thickness t1 in the vertical direction relative to the maximum diameter R1 in the left-right direction as viewed from one side.

Preferably, a ratio t/R of a number average t (also referred to below as an "average thickness t") of thicknesses t1 of the flat titanium pigment particles 10 to a number average R (also referred to below as an "average maximum diameter R") of the maximum diameters R1 thereof is no greater than 0.75. The ratio t/R can be measured by the method described later in Examples, for example.

Note that the shape of the flat titanium pigment particle 10 illustrated in FIG. 3 is a perfect circular shape in plan view. However, the shape of the flat titanium pigment particles 10 in plan view is not limited particularly and may be irregular. When the flat titanium pigment particles 10 are covered with the pigment coating resin, the first pigment particles also have a flat shape as well as the flat titanium pigment particles 10 because the pigment coating resin attaches to the flat titanium pigment particles 10 along the surface profile of the flat titanium pigment particles 10. The flat shape of the titanium pigment particles has been described so far with reference to FIGS. 3 and 4.

In order to print constant line width images on the non-absorbent recording medium by smoothing the surface of the dried coating film (e.g., a background image) of the first ink, the ratio t/R of the average thickness t to the average maximum diameter R of the flat titanium pigment particles is preferably no greater than 0.75, more preferably greater than 0.00 and no greater than 0.75, and further preferably greater than 0.00 and no greater than 0.50.

The dried coating film of the first ink has a 60 degree gloss of preferably at least 50 and no greater than 100, more preferably at least 70 and no greater than 100, further preferably at least 80 and no greater than 100, and further more preferably at least 90 and no greater than 100. The smaller the ratio t/R of the flat titanium pigment particles is, the more smooth the flat surface of the dried coating film of the first ink tends to be and the higher the 60 degree gloss of the dried coating film of the first ink tends to be. When the 60 degree gloss of the dried coating film (e.g., a background image) of the first ink is at least 50 and no greater than 100, the surface of the dried coating film is sufficiently smooth. Accordingly, constant line width images can be favorably formed on the non-absorbent recording medium.

For example, the 60 degree gloss of the dried coating film of the first ink can be measured by measuring the dried coating film of the first ink formed on a non-absorbent recording medium under a condition of an incident angle of 60 degrees using a gloss meter compliant with the Japanese Industrial Standards (JIS) K 5600-4-7:1999.

The titanium contained in the flat titanium pigment particles is preferably titanium oxide, and more preferably rutile type titanium oxide. Surface-treated titanium oxide is further preferable because it exhibits relatively favorable dispersibility in aqueous media. For example, titanium oxide surface treated with either or both silica and alumina is preferable. Titanium oxide surface treated with either or both silica and alumina and further surface treated with a silane coupling agent is also preferable. A commercially available product with a desired flat shape may be used as the flat titanium pigment particles.

As the first pigment particles, the first ink may contain only the flat titanium pigment particles containing a flat titanium pigment as a pigment. Alternatively, the first ink may further contain pigment particles other than those. The first ink may contain only the flat titanium pigment as a pigment or may further contain a pigment other than that. The flat titanium pigment has a percentage content of preferably at least 90% by mass in the total of pigments contained in the first ink, more preferably at least 95% by mass, and particularly preferably 100% by mass. The flat titanium pigment particles have a percentage content of preferably at least 5.0% by mass and no greater than 15.0% by mass to the mass of the first ink, and more preferably at least 5.0% by mass and no greater than 10.0% by mass.

(Second Pigment Particles)

Examples of a pigment contained in the second pigment particles include non-white pigments (specific examples include yellow pigments, orange pigments, red pigments, blue pigments, violet pigments, and black pigments) and white pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7). Examples of the white pigments include C.I. Pigment White (4, 5, 6, 6:1, 7, 18, 19, 20, 21, 23, 24, 25, 26, 27, or 28). Titanium oxide may be used as a white pigment.

Because of being used for printing background images, the titanium pigment contained in the flat titanium pigment particles is preferably a white pigment and the first ink is preferably a white ink. Because of being used for printing images further on the background images, the pigment contained in the second pigment particles is preferably a non-white pigment and the second ink is preferably a non-white ink.

The second pigment particles have a percentage content of preferably at least 0.5% by mass and no greater than 10.0% by mass to the mass of the second ink, and more preferably at least 1.5% by mass and less than 5.0% by mass.

(Pigment Coating Resin)

The pigment coating resin is a polymer dispersant for dispersing the corresponding pigment particles (first pigment particles or second pigment particles). The pigment coating resin is preferably a resin soluble in aqueous media. At least a portion of the pigment coating resin is present for example on the surfaces of the corresponding pigment particles (first pigment particles or second pigment particles) for optimizing dispersibility of the pigment particles. However, another portion of the pigment coating resin may be present in a state dissolved in the corresponding aqueous medium (first aqueous medium or second aqueous medium), for example. The first pigment particles and the second pigment particles are pigment particles (non-self-dispersion type pigments) dispersed in the corresponding aqueous media by a dispersant such as the pigment coating resin, for example. However, the first pigment particles and the second pigment particles may be pigment particles (self-dispersion type pigment particles) dispersed in the corresponding aqueous media without a dispersant.

Examples of the pigment coating resin include acrylic resin, styrene-acrylic resin, and styrene maleic acid copolymers. The acrylic resin includes at least a repeating unit derived from (meth)acrylic acid. The styrene-acrylic resin includes a repeating unit derived from styrene and a repeating unit derived from at least one monomer of (meth)acrylic acid alkyl ester and (meth)acrylic acid. Examples of the (meth)acrylic acid alkyl ester include methyl (meth)acrylate, ethyl (meth)acrylate, propyl (meth)acrylate, and butyl (meth)acrylate. The styrene-acrylic resin is preferably a copolymer of styrene, methyl methacrylate, methacrylic acid, and butyl acrylate.

As the pigment coating resin, a commercially available product may be used. Examples of the commercially available product of the pigment coating resin include JONCRYL (registered Japanese trademark) 586 and JONCRYL 611 each produced by BASF Japan Ltd., DISPERBYK (registered Japanese trademark)-190, DISPERBYK-191, and DISPERBYK-2010 each produced by BYK Chemie Japan, K.K., and SOLSPERSE 20000 and SOLSPERSE 27000 each produced by Lubrizol Japan Limited. DISPERBYK-190 is an acrylic polymer dispersant, and more specifically an acrylic block copolymer with a pigment affinity group. Furthermore, DISPERBYK-2010 is a styrene maleic acid copolymer.

The ratio of the mass of the pigment coating resin to the mass of the pigment (titanium pigment contained in the flat titanium pigment particles or pigment contained in the second pigment particles) is preferably at least 0.02 and no greater than 0.45, and more preferably at least 0.05 and no greater than 0.15. As a result of the ratio of the mass of the pigment coating resin to the mass of the pigment being set to no greater than 0.45, each viscosity of the pigment dispersion and the ink (first ink or second ink) can be easily adjusted to a desired value. As a result of the ratio of the mass of the pigment coating resin to the mass of the pigment being set to at least 0.02, dispersion stability of the ink (first ink or second ink) increases.

<First Binder and Second Binder>

As described previously, the first binder contained in the first ink has a Young's modulus of at least 600 N/mm$^2$ and no greater than 1600 N/mm$^2$. In order to print images with excellent scratch resistance on the non-absorbent recording medium, the Young's modulus of the first binder is preferably at least 1000 N/mm$^2$ and no greater than 1600 N/mm$^2$, and more preferably at least 1300 N/mm$^2$ and no greater than 1600 N/mm$^2$.

The Young's modulus of the second binder is preferably at least 350 N/mm$^2$ and no greater than 1600 N/mm$^2$, more preferably at least 350 N/mm$^2$ and less than 1000 N/mm$^2$, and further preferably at least 600 N/mm$^2$ and no greater than 900 N/mm$^2$. The Young's modulus of the second binder within the above range is relatively high. The second binder (binding agent), which has a higher Young's modulus, has a higher rigidity, so the second ink firmly bonds to a dried coating film of the first ink formed as a result of the first ink ejected onto the non-absorbent recording medium being dried. Thus, scratch resistance of the second ink to the dried coating film (e.g., a film forming a background image) of the first ink on the non-absorbent recording medium increases.

The Young's modulus of each binder (the first binder and the second binder) can be measured by the following method, for example. That is, a water dispersion of the binder is obtained by mixing 30 parts by mass of the binder and 70 parts by mass of water. A binder film with a film thickness of 500 μm is generated in a manner that the water dispersion of the binder is charged into a TEFLON (registered Japanese trademark) coated Schale, dried at room temperature (25° C.) for 15 hours, dried at 80° C. for 6 hours, and then dried at 120° C. for 20 minutes. The Young's modulus (unit: N/mm$^2$) thereof is obtained by performing a tensile strength test by a method in accordance with the Japanese Industrial Standards (JIS) K6251:2017.

The Young's modulus of the first binder may be equal to or lower than the Young's modulus of the second binder. However, the Young's modulus of the first binder is preferably higher than the Young's modulus of the second binder for the reasons described below. The composition of the first ink significantly differs from the composition of the non-absorbent recording medium, so the first ink does not easily bond to the non-absorbent recording medium. As such, the first binder contained in the first ink needs to have a high rigidity in order to firmly bond to the non-absorbent recording medium. By contrast, the composition of the second ink is relatively similar to the composition of the first ink, so the second ink easily bonds to the dried coating film of the first ink. Thus, the rigidity of the second binder contained in the second ink is enough for the second ink to bond to the dried coating film of the first ink even when the rigidity thereof is lower than that of the first binder.

In order to print images with excellent scratch resistance on the non-absorbent recording medium, a difference (E1–E2) between the Young's modulus (E1) of the first binder and the Young's modulus (E2) of the second binder is preferably at least −650 and no greater than 950, more preferably at least 0 and no greater than 950, further preferably at least 300 and no greater than 950, further more preferably at least 500 and no greater than 950, and particularly preferably at least 500 and no greater than 700.

The first binder and the second binder are water insoluble polymers, for example. Preferably, emulsified particles constituted by the first binder are dispersed in the first aqueous medium. It is also preferable that emulsified particles constituted by the second binder are dispersed in the second aqueous medium.

No particular limitations are placed on the first binder and the second binder, and examples thereof include polyurethane, acrylic resin, styrene-acrylic resin, acrylic urethane resin, polyester resin, and modified polyolefin resin.

Preferably, both the first binder and the second binder are polyurethanes. When the first binder and the second binder are polyurethanes, scratch resistance of the first ink to the non-absorbent recording medium increases in presence of a polar group of the polyurethane of the first ink. Also, as a result of the first binder and the second binder being polyurethanes, scratch resistance of the second ink to the dried coating film of the first ink increases because the composition of the first binder and the composition of the second binder resin are the same as or similar to each other.

In one preferable example for printing images with excellent scratch resistance on the non-absorbent recording medium, the first binder is a polyurethane with a Young's modulus of at least 1000 N/mm$^2$ and no greater than 1600 N/mm$^2$ and the second binder is a polyurethane with a Young's modulus of at least 350 N/mm$^2$ and less than 1000 N/mm$^2$. It is further preferable that the first binder is a polyurethane with a Young's modulus of at least 1000 N/mm$^2$ and no greater than 1600 N/mm$^2$ and the second binder is a polyurethane with a Young's modulus of at least 700 N/mm$^2$ and less than 1000 N/mm$^2$.

In another preferable example for printing images with excellent scratch resistance on the non-absorbent recording medium, each of the first binder and the second binder is preferably a polyurethane with a Young's modulus of at least 350 N/mm$^2$ and no greater than 1000 N/mm$^2$, and more preferably a polyurethane with a Young's modulus of at least 700 N/mm$^2$ and no greater than 1000 N/mm$^2$.

Examples of polyurethane that can be used as the first binder or the second binder include non-yellowing polyurethane and polyurethane (also referred to below as aromatic-containing polyurethane) including a repeating unit derived from an aromatic isocyanate. Examples of the aromatic-containing polyurethane include polyurethanes including a repeating unit derived from an aromatic isocyanate ether. The non-yellowing polyurethane is a polyurethane that hardly yellows or does not yellow when irradiated for example with ultraviolet rays. The non-yellowing polyurethane includes a repeating unit derived from either or both an aliphatic isocyanate and an alicyclic isocyanate, for example. The non-yellowing polyurethane may include a repeating unit derived from an aromatic isocyanate. However, in order to favorably inhibit yellowing, the non-yellowing polyurethane preferably does not include a repeating unit derived from an aromatic isocyanate. When the non-yellowing polyurethane includes a repeating unit derived from an aromatic isocyanate, the percentage content of the repeating unit derived from an aromatic isocyanate in all repeating units of the non-yellowing polyurethane is preferably lower than the percentage content of the repeating unit derived from an aromatic isocyanate in all repeating units of the aromatic-containing polyurethane. Examples of the non-yellowing polyurethane include non-yellowing polyurethanes including a repeating unit derived from isocyanate ester/ether and non-yellowing polyurethanes including a repeating unit derived from isocyanate carbonate.

In order to print images with excellent scratch resistance on the non-absorbent recording medium, the first binder is preferably an aromatic-containing polyurethane. For the same purpose as above, it is more preferable that the second binder is a non-yellowing polyurethane.

Each of the polyurethanes is not limited particularly and may be a polyurethane having a urethane bond in its molecule. An emulsion may be used in which emulsified particles constituted by the polyurethane are dispersed in the corresponding aqueous medium. Examples of commercially available products of the polyurethane emulsion include SUPERFLEX (registered Japanese trademark) 870 (Young's modulus 1486 N/mm$^2$), SUPERFLEX 170 (Young's modulus 884 N/mm$^2$), SUPERFLEX 420 (Young's modulus 565 N/mm$^2$), SUPERFLEX 126 (Young's modulus 1328 N/mm$^2$), SUPERFLEX 150 (Young's modulus 807 N/mm$^2$), SUPERFLEX 150HS (Young's modulus 798 N/mm$^2$), SUPERFLEX 210 (Young's modulus 1396 N/mm$^2$), SUPERFLEX 420NS (Young's modulus 565 N/mm$^2$), SUPERFLEX 650 (Young's modulus 374 N/mm$^2$), SUPER-FLEX 820 (Young's modulus 1394 N/mm$^2$), SUPERFLEX 830HS (Young's modulus 1052 N/mm$^2$), and SUPERFLEX 860 (Young's modulus 1288 N/mm$^2$) each produced by DKS Co. Ltd. Among these commercially available polyurethane products, a polyurethane with a Young's modulus of at least 600 N/mm$^2$ and no greater than 1600 N/mm$^2$ can also be used as the first binder. Furthermore, among these commercially available polyurethane products, a polyurethane with a Young's modulus of at least 350 N/mm$^2$ and no greater than 1600 N/mm$^2$ is preferably used as the second binder.

In order to print images with excellent scratch resistance on the non-absorbent recording medium, the first binder and the second binder are preferably anionic.

In order to print images with excellent scratch resistance on the non-absorbent recording medium, the first binder has a glass transition point of preferably at least 70° C. and no greater than 80° C., more preferably at least 75° C. and no greater than 78° C., and further preferably at least 76° C. and no greater than 78° C. For the same purpose as above, the second binder has a glass transition point of preferably at least −20° C. and no greater than 80° C., more preferably at least −10° C. and no greater than 78° C., and further preferably at least 50° C. and no greater than 75° C.

In order to print images with excellent scratch resistance on the non-absorbent recording medium, the first binder has a heat softening temperature of preferably at least 70° C. and no greater than 200° C. more preferably at least 70° C. and no greater than 188° C., and further preferably at least 70° C. and no greater than 130° C. For the same purpose as above, the second binder has a heat softening temperature of preferably at least 70° C. and no greater than 200° C., more preferably at least 140° C. and no greater than 200° C., and further preferably at least 188° C. and no greater than 198° C.

In order to print images with excellent scratch resistance on the non-absorbent recording media, the first binder has a thermal melting temperature of preferably at least 120° C. and no greater than 200° C., and more preferably at least 120° C. and no greater than 150° C. For the same purpose as above, the second binder has a thermal melting temperature of preferably at least 120° C. and no greater than 210° C., and more preferably at least 160° C. and no greater than 210° C.

In order to print images with excellent scratch resistance on the non-absorbent recording medium, the first binder has a percentage content of preferably at least 1% by mass and no greater than 10% by mass to the mass of the first ink, and more preferably at least 1% by mass and no greater than 5% by mass. For the same purpose as above, the second binder has a percentage content of preferably at least 1% by mass and no greater than 10% by mass to the mass of the second ink, and more preferably at least 1% by mass and no greater than 5% by mass.

<First Aqueous Medium and Second Aqueous Medium>

The first aqueous medium and the second aqueous medium each are a medium containing water. The first aqueous medium and the second aqueous medium may each function as a solvent or function as a dispersion medium. Specific examples of the first aqueous medium and the second aqueous medium include aqueous media containing water and a water-soluble organic solvent.

Examples of the water-soluble organic solvent include monohydric alcohols, glycol compounds, triol compounds, glycol ether compounds, lactam compounds, nitrogen-containing compounds, acetate compounds, γ-butyrolactone, thiodiglycol, and dimethyl sulfoxide.

Examples of the monohydric alcohols include methanol, ethanol, propanols (e.g., I-propanol and 2-propanol), and butanol. A preferable monohydric alcohol is 2-propanol.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is propylene glycol.

Examples of the triol compounds include glycerin, 1,2, 3-butanetriol, and 1,2,6-hexanetriol.

Examples of the glycol ether compounds include alkylene glycol alkyl ethers, and more specific examples include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether (i.e., butyl triglycol), and propylene glycol monomethyl ether. A preferable glycol ether compound is triethylene glycol monobutyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

A solvent mixture of water, 2-propanol, propylene glycol, and triethylene glycol monobutyl ether is preferable as the aqueous media.

The first aqueous medium has a percentage content of preferably at least 30% by mass and no greater than 95% by mass to the mass of the first ink, and more preferably at least 70% by mass and no greater than 95% by mass. The water-soluble organic solvent contained in the first ink has a percentage content of preferably at least 10% by mass and no greater than 50% by mass to the mass of the first ink, and more preferably at least 30% by mass and no greater than 40% by mass.

The second aqueous medium has a percentage content of preferably at least 30% by mass and no greater than 95% by mass to the mass of the second ink, and more preferably at least 70% by mass and no greater than 95% by mass. The water-soluble organic solvent contained in the second ink has a percentage content of preferably at least 10% by mass and no greater than 50% by mass to the mass of the second ink, and more preferably at least 30% by mass and no greater than 40% by mass.

<Surfactant>

The first ink and the second ink may each contain a surfactant. Examples of the surfactant include acetylene surfactants, acrylic surfactants, silicone surfactants, and fluroic surfactants. The acetylene surfactants refer to surfactants having an acetylene bond (triple bond between carbon atoms) in their molecules. The acrylic surfactants refer to surfactants that are polymers of (meth)acrylic acid or derivatives thereof. The fluroic surfactants refer to surfactants with a fluoro group in their molecules.

The surfactant is preferably a silicone surfactant. The silicone surfactant refers to a surfactant having a siloxane bond in its molecule. Examples of commercially available products of the silicone surfactant include SILFACE (registered Japanese trademark) SAG002 and SILFACE SAG503A each produced by Nissin Chemical Industry Co., Ltd.

The surfactant contained in the first ink preferably has a percentage content of at least 0.01% by mass and no greater than 1.00% by mass to the mass of the first ink. The surfactant contained in the second ink preferably has a percentage content of at least 0.01% by mass and no greater than 1.00% by mass to the mass of the second ink.

<Optional Component>

The first ink and the second ink may each contain an optional component according to necessity. Examples of the optional component include a pH adjuster, a chelating agent, a preservative, and a fungicide. The percentage content of the optional component is not limited particularly and may be appropriately set according to necessity <Method for Producing First Ink or Second Ink>

A method for producing the first ink or the second ink includes a pigment dispersion preparation process and a mixing process.

In the pigment dispersion preparation process for the first ink, the flat titanium pigment particles, the first aqueous medium, and the pigment coating resin as necessary are mixed using a disperser, for example. As a result, a pigment dispersion in which the first pigment particles including the flat titanium pigment particles are dispersed is obtained. In the pigment dispersion preparation process for the second ink, the pigment, the second binder, the second aqueous medium, and the pigment coating resin as necessary are mixed using a disperser, for example. As a result, a pigment dispersion in which the second pigment particles including the pigment are dispersed is obtained. The dispersers are not limited particularly and examples thereof include ball mills and bead mills. Among these, a bead mill is preferably used. Examples of the bead mill include an ATTRITOR (registered Japanese trademark) (product of Nippon Coke & Engineering Co., Ltd.), a sand grinder (product of Aimex Co. Ltd.), a DYNO (registered Japanese trademark) mill (product of Willy A. Bachofen AG), and an Ultra Apex Mill (product of Hiroshima Metal & Machinery Co., Ltd.). When coarse particles are contained in the resultant pigment dispersions, the coarse particles are preferably removed by filtration or centrifugation.

In the mixing process for the first ink, the pigment dispersion containing the first pigment particles, the first binder, the further added first aqueous medium, and a component (e.g., a surfactant) added as necessary are mixed to obtain the first ink. In the mixing process for the second ink, the pigment dispersion containing the second pigment particles, the second binder, the further added second aqueous medium, and a component (e.g., a surfactant) added as necessary are mixed to obtain the second ink. When coarse particles are contained in the first ink or the second ink, the coarse particles are preferably removed by filtration or centrifugation.

Second Embodiment: Inkjet Ink Recording Apparatus

Figure 5:
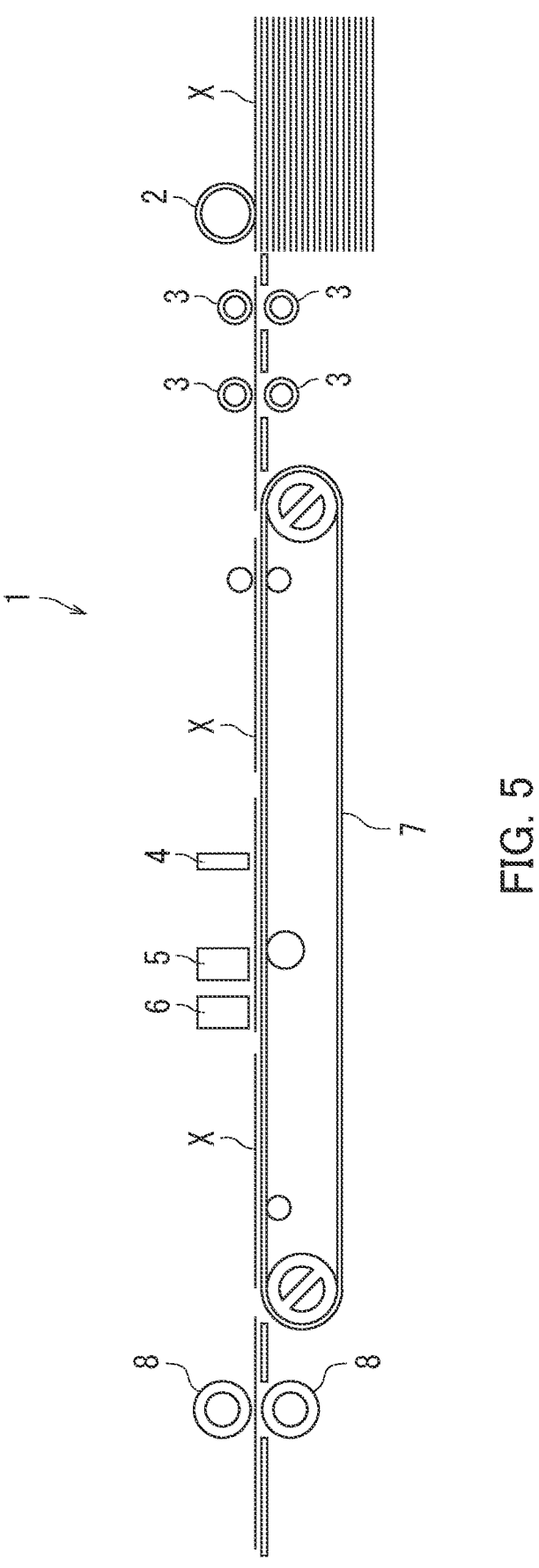
FIG. 5 is a diagram illustrating an example of an inkjet recording apparatus of a second embodiment of the present disclosure.

With reference to FIG. 5, an inkjet recording apparatus 1, which is one example of an inkjet recording apparatus according to a second embodiment of the present disclosure, is described below. FIG. 5 illustrates the inkjet recording apparatus 1 of the second embodiment.

The inkjet recording apparatus 1 of the second embodiment includes a first ink, a second ink, a sheet feed roller 2, a plurality of conveyance roller pairs 3, a sensor 4, a first recording head 5, a second recording head 6, a conveyor belt 7, and an ejection roller pair 8. In the second embodiment, the first ink is accommodated in the first recording head 5 and the second ink is accommodated in the second recording head 6.

The first ink and the second ink are respectively the first ink and the second ink included in the ink set of the first embodiment. As such, the inkjet recording apparatus 1 of the second embodiment can print constant line width images with excellent scratch resistance on a recording medium X (e.g., a non-absorbent recording medium) for the same reasons as those described in the first embodiment.

The inkjet recording apparatus 1 accommodates sheets of the recording medium X in a sheet feed cassette (not illustrated). The recording medium X is a non-absorbent recording medium, for example.

The sheet feed roller 2 rotates to feed the sheets of the recording medium X one by one from the uppermost sheet.

The conveyance roller pairs 3 convey the fed recording medium X to the conveyor belt 7.

The conveyor belt 7 is an endless belt horizontally wound between a pair of rollers. The recording medium X conveyed by the conveyance roller pairs 3 is conveyed to the ejection roller pair 8 as the conveyor belt 7 runs.

The sensor 4 is located above the conveyor belt 7. The sensor 4 is also located upstream of the first recording head 5 in terms of a conveyance direction of the recording medium X. The sensor 4 detects the leading end of the recording medium X being conveyed by the conveyor belt 7. Based on the time when the sensor 4 detects the leading end of the recording medium X, a first ink ejection instruction is output to the first recording head 5 and a second ink ejection instruction is output to the second recording head 6.

The first recording head 5 and the second recording head 6 are provided above the conveyor belt 7. The first recording head 5 is provided upstream of the second recording head 6 in terms of a direction in which the conveyor belt 7 runs (corresponding to the conveyance direction of the recording medium X). The first recording head 5 and the second recording head 6 are long line scan type recording heads with a width equal to or larger than the width of the recording medium X, for example. The first recording head 5 and the second recording head 6 include many nozzles in their lower surfaces (ejection surfaces) facing the conveyor belt 7. The first recording head 5 and the second recording head 6 each extend in a direction perpendicular to the conveyance direction of the recording medium X and are fixed to the inkjet recording apparatus 1. Furthermore, the first recording head 5 and the second recording head 6 are fixed to the inkjet recording apparatus 1 so that their lower surfaces are out of contact with the recording medium X on the conveyor belt 7.

The first recording head 5 accommodates the first ink of the ink set of the first embodiment. While the recording medium X is being conveyed by the conveyor belt 7, the first recording head 5 (more specifically, the many nozzles of the first recording head 5) ejects the first ink toward the recording medium X. A background image (white image) is printed on the recording medium X in the manner described above. The first ink may be ejected to the entirety of the recording medium X. However, the background image can be printed with a small amount of the first ink, and it is therefore preferable that the first ink is ejected toward only an area of the recording medium X where the second ink is to be ejected or toward an area thereof that is wider than an area thereof where the second ink is to be ejected.

The second recording head 6 accommodates the second ink included in the ink set of the first embodiment. After the first ink is ejected from the first recording head 5, the second recording head 6 (more specifically, the many nozzles of the second recording head 6) ejects the second ink toward the recording medium X. In detail, the second recording head 6 ejects the second ink toward at least a part (e.g., a part or the entirety) of the area of the recording medium X where the first ink has been ejected.

The recording medium X to which the second ink has been ejected from the second recording head 6 continues to be conveyed by the conveyor belt 7. The recording medium X is then delivered to the ejection roller pair 8 at the terminal end of the conveyor belt 7, and ejected from the conveyor belt 7.

The ejection roller pair 8 ejects the recording medium X. In the manner described above, the background image (e.g., a white image) is printed on the recording medium X with the first ink and an image (e.g., a non-white image) is printed on the background image with the second ink.

The inkjet recording apparatus 1, which is one example of the inkjet recording apparatus of the second embodiment, has been described so far with reference to FIG. 5. However, the inkjet recording apparatus of the second embodiment is not limited to the aforementioned inkjet recording apparatus 1 and can be changed as in the following first to fourth variations, for example.

The first variation is as follows. An example in which a recording medium X cut into a specific size (e.g., A4 size)

is used is presented for the inkjet recording apparatus 1. However, a rolled recording medium may be used, for example.

The second variation is as follows. An example in which two recording heads such as the first recording head 5 and the second recording head 6 are provided is presented for the inkjet recording apparatus 1. However, three or more recording heads may be provided. For example, when a plurality of recording heads that eject the second ink are provided, images with multiple colors can be printed.

The third variation is as follows. An example in which no wiping blade is provided is presented for the inkjet recording apparatus 1. However, wiping blades may be provided that wipe the ejection surfaces of the first recording head 5 and the second recording head 6.

The fourth variation is as follows. An example in which the first recording head 5 and the second recording head 6 are of line scan type is presented for the inkjet recording apparatus 1. However, serial scan type recording heads that run relative to the recording medium X may be provided.

Third Embodiment: Inkjet Ink Recording Method

With reference further to FIG. 5, an inkjet recording method according to a third embodiment of the present disclosure is described. The inkjet recording method of the third embodiment uses a first ink and a second ink. The first ink and the second ink are respectively the first ink and the second ink included in the ink set of the first embodiment. The inkjet recording method of the third embodiment includes ejecting the first ink toward a recording medium X (first ink ejection process) and ejecting the second ink toward at least a part of an area of the recording medium X where the first ink has been ejected (second ink ejection process). The recording medium X is a non-absorbent recording medium, for example.

The first ink and the second ink used in the inkjet recording method of the third embodiment are respectively the first ink and the second ink of the ink set of the first embodiment. As such, the inkjet recording method of the third embodiment can achieve printing of constant line width images with excellent scratch resistance on the non-absorbent recording medium.

The inkjet recording method of the third embodiment is implemented by using the inkjet recording apparatus 1 of the second embodiment, for example. In the first ink ejection process, the first recording head 5 ejects the first ink toward the recording medium X. In the second ink ejection process, the second recording head 6 ejects the second ink toward at least a part of an area of the recording medium X where the first ink has been ejected. The inkjet recording method according to the third embodiment has been described so far with reference to FIG. 5.

Examples

The following presents examples for providing further detailed description of the present disclosure. However, the present disclosure is not limited thereto. In Examples below, "ion exchange water" may be referred to simply as "water". <White Pigment Preparation>

The following white pigments were prepared for use in production of white pigment dispersions.

White pigment (JR-804): rutile type titanium oxide ("JR-804", product of TAYCA CORPORATION)

White pigment (JR-806): rutile type titanium oxide ("JR-806", product of TAYCA CORPORATION) surface-treated with silica and alumina White pigment (CR-50): rutile type titanium oxide ("CR-50", product of ISHIHARA SANGYO KAISHA, LTD.) surface-treated with alumina White pigment (CR-50-2): rutile type titanium oxide ("CR-50-2", product of ISHIHARA SANGYO KAISHA, LTD.) surface treated with alumina and an organic substance White pigment (KRONOS 2225): rutile type titanium oxide ("KRONOS (registered trademark) 2225", product of KRONOS) surface-treated with alumina and silica White pigment (KRONOS 4045): rutile type titanium oxide ("KRONOS (registered trademark) 4045", product of KRONOS)

<Shape Determination of White Pigment>

With respect to each of the white pigments, 100 parts by mass of the white pigment and 25 parts by mass of propylene glycol were mixed to obtain a paste of the white pigment. The paste of the white pigment was observed using a scanning electron microscope (SEM, "JSM-7900F", product of JEOL Ltd.) with a magnification of 30,000%. Maximum diameters $R1$ of 100 particles of the white pigment recognized in the observation field of view were measured, and the average thereof was taken as an average maximum diameter $R$. Thicknesses $t1$ of 100 particles of the white pigment recognized in the observation field of view were measured, and the average thereof was taken as an average thickness $t$. Thereafter, a ratio $t/R$ of the average thickness $t$ to the average maximum diameter $R$ of the white pigment was calculated. Based on the calculated ratio $t/R$, the white pigment was classified as particularly flat, slightly flat, or spherical according to the following criteria. A white pigment classified as particularly flat or slightly flat was determined to be a white pigment (flat titanium pigment particles) with a flat shape. Shape classification of the white pigments are shown in Tables 1 and 2 described later.

(Shape Classification of White Pigments)

Particularly flat: ratio $t/R$ of greater than 0.00 and no greater than 0.50

Slightly flat: ratio $t/R$ of greater than 0.50 and no greater than 0.75

Spherical: ratio $t/R$ of greater than 0.75 and no greater than 1.00

<Pigment Coating Resin Preparation>

The following pigment coating resins were prepared for use in production of white pigment dispersions and cyan pigment dispersions.

Pigment coating resin (A1): "DISPERBYK-190" produced by BYK Chemie Japan, K.K. (solid concentration: 40% by mass, dispersion medium: water)

Pigment coating resin (A2): "DISPERBYK-2010 produced by BYK Chemie Japan, K.K. (solid concentration: 40% by mass, dispersion medium: water, solid content: modified styrene maleic acid copolymer)

<Binder Preparation>

The following binders were prepared for used in preparation of white inks and cyan inks.

Binder (B1): non-yellowing polyurethane ("SUPERFLEX (registered Japanese trademark) 170", product of DKS Co. Ltd., Young's modulus 884 N/mm², non-volatile content 33% by mass, anionic binder, glass transition point 75° C., heat softening temperature 188° C., thermal melting temperature 194° C.) including a repeating unit derived from isocyanate ester/ether Binder (B2): polyurethane ("SUPERFLEX (registered Japanese trademark) 870", product of DKS Co. Ltd., Young's modulus 1486 N/mm², non-volatile content 30% by mass, anionic binder, glass transition point 78° C., heat softening temperature 79° C., thermal melting temperature 125° C.) including a repeating unit derived from aromatic isocyanate ether Binder (B3): non-yellowing polyurethane ("SUPERFLEX (registered Japanese trademark) 420", product of DKS Co. Ltd., Young's modulus 565 N/mm², non-volatile content 32% by mass, anionic binder, glass transition point −10° C., heat softening temperature 198° C., thermal melting temperature 205° C.) including a repeating unit derived from isocyanate carbonate Binder (B4): non-yellowing polyurethane ("SUPERFLEX (registered Japanese trademark) 470", product of DKS Co. Ltd., Young's modulus 13 N/mm², non-volatile content 38% by mass, anionic binder, glass transition point −31° C., heat softening temperature 97° C., thermal melting temperature 138° C.) including a repeating unit derived from isocyanate carbonate <White Pigment Dispersion Production>

White pigment dispersions (LW-1) to (LW-8) and (HLW-1) to (HLW-4) were produced. The compositions of these white pigment dispersions are shown in Tables 1 and 2. "Part" in Tables 1 and 2 refers to part by mass.

TABLE 1

| White pigment dispersion | | LW-1 | LW-2 | LW-3 | LW-4 | LW-5 | LW-6 |
|---|---|---|---|---|---|---|---|
| White pigment | Type | JR-804 | JR-804 | JR-806 | JR-806 | CR-50 | CR-50 |
| | Shape | Particularly flat | Particularly flat | Particularly flat | Particularly flat | Slightly flat | Slightly flat |
| | Amount [part] | 100 | 100 | 100 | 100 | 100 | 100 |
| Pigment coating resin | Type | A1 | A2 | A1 | A2 | A1 | A2 |
| | Amount [part] | 25 | 25 | 25 | 25 | 25 | 25 |
| 2-Propanol | Amount [part] | 10 | 10 | 10 | 10 | 10 | 10 |
| Water | Amount [part] | 65 | 65 | 65 | 65 | 65 | 65 |

TABLE 2

| White pigment dispersion | | LW-7 | LW-8 | HLW-1 | HLW-2 | HLW-3 | HLW-4 |
|---|---|---|---|---|---|---|---|
| White pigment | Type | CR-50-2 | CR-50-2 | KRONOS 2225 | KRONOS 2225 | KRONOS 4045 | KRONOS 4045 |
| | Shape | Slightly flat | Slightly flat | Spherical | Spherical | Spherical | Spherical |
| | Amount [part] | 100 | 100 | 100 | 100 | 100 | 100 |

TABLE 2-continued

| White pigment dispersion | | LW-7 | LW-8 | HLW-1 | HLW-2 | HLW-3 | HLW-4 |
|---|---|---|---|---|---|---|---|
| Pigment | Type | A1 | A2 | A1 | A2 | A1 | A2 |
| coating resin | Amount [part] | 25 | 25 | 25 | 25 | 25 | 25 |
| 2-Propanol | Amount [part] | 10 | 10 | 10 | 10 | 10 | 10 |
| Water | Amount [part] | 65 | 65 | 65 | 65 | 65 | 65 |

(Production of White Pigment Dispersion (LW-1))

Components were charged into a vessel to give the blending amounts in a white pigment dispersion the blending amounts shown in the column titled White pigment dispersion (LW-1) in Table 1. The vessel contents were mixed using a disperser to obtain a pre-dispersion. Next, the pre-dispersion was further mixed using a bead mill ("DYNO (registered Japanese trademark) MILL", product of Willy A. Bachofen AG) loaded with zirconia beads with a diameter of 0.3 mm to obtain a white pigment dispersion (LW-1). First pigment particles containing a white pigment and a pigment coating resin were dispersed in the white pigment dispersion (LW-1).

(Production of White Pigment Dispersions (LW-2) to (LW-8) and (HLW-1) to (HLW-4))

White pigment dispersions (LW-2) to (LW-8) and (HLW-1) to (HLW-4) were each produced according to the same method as that for producing the white pigment dispersion (LW-1) in all aspects other than that the corresponding components were charged into a vessel to give the blending amounts in the white pigment dispersion the blending amounts shown in corresponding one of the columns titled White pigment dispersions (LW-2) to (LW-8) and (HLW-1) to (HLW-4) in Tables 1 and 2.

<Cyan Pigment Dispersion Preparation>

"AE2034F" produced by SANYO COLOR WORKS, Ltd. was used as a cyan pigment dispersion (LC-1). Second pigment particles containing a cyan pigment and a pigment coating resin were dispersed in the cyan pigment dispersion (LC-1).

[Study 1: Shape of First Pigment Particles]

The shape of the first pigment particles contained in the first ink was studied.

[Production of Inks Used in Study 1]

White inks (I-1) to (I-12) and a cyan ink (I-A) for use in Study 1 were produced by the following methods. Compositions of these inks are shown in Tables 3 to 5.

TABLE 3

| White ink | | | I-1 | I-2 | I-3 | I-4 | I-5 | I-6 |
|---|---|---|---|---|---|---|---|---|
| Blending | White | LW-1 | 13 | — | — | — | — | — |
| amount | pigment | LW-2 | — | 13 | — | — | — | — |
| [part] | disper- | LW-3 | — | — | 13 | — | — | — |
| | sion | LW-4 | — | — | — | 13 | — | — |
| | | LW-5 | — | — | — | — | 13 | — |
| | | LW-6 | — | — | — | — | — | 13 |
| | | LW-7 | — | — | — | — | — | — |
| | | LW-8 | — | — | — | — | — | — |
| | | HLW-1 | — | — | — | — | — | — |
| | | HLW-2 | — | — | — | — | — | — |
| | | HLW-3 | — | — | — | — | — | — |
| | | HLW-4 | — | — | — | — | — | — |

TABLE 3-continued

| White ink | | I-1 | I-2 | I-3 | I-4 | I-5 | I-6 |
|---|---|---|---|---|---|---|---|
| Binder | B1 | 3 | 3 | 3 | 3 | 3 | 3 |
| Propylene glycol | | 25 | 25 | 25 | 25 | 25 | 25 |
| Butyl triglycol | | 8 | 8 | 8 | 8 | 8 | 8 |
| Surfactant | | 0.4 | 0.4 | 0.4 | 0.4 | 0.4 | 0.4 |
| Water | | Rest | Rest | Rest | Rest | Rest | Rest |
| Total | | 100 | 100 | 100 | 100 | 100 | 100 |

TABLE 4

| White ink | | | I-7 | I-8 | I-9 | I-10 | I-11 | I-12 |
|---|---|---|---|---|---|---|---|---|
| Blending | White | LW-1 | — | — | — | — | — | — |
| amount | pigment | LW-2 | — | — | — | — | — | — |
| [part] | disper- | LW-3 | — | — | — | — | — | — |
| | sion | LW-4 | — | — | — | — | — | — |
| | | LW-5 | — | — | — | — | — | — |
| | | LW-6 | — | — | — | — | — | — |
| | | LW-7 | 13 | — | — | — | — | — |
| | | LW-8 | — | 13 | — | — | — | — |
| | | HLW-1 | — | — | 13 | — | — | — |
| | | HLW-2 | — | — | — | 13 | — | — |
| | | HLW-3 | — | — | — | — | 13 | — |
| | | HLW-4 | — | — | — | — | — | 13 |
| Binder | B1 | 3 | 3 | 3 | 3 | 3 | 3 |
| Propylene glycol | | 25 | 25 | 25 | 25 | 25 | 25 |
| Butyl triglycol | | 8 | 8 | 8 | 8 | 8 | 8 |
| Surfactant | | 0.4 | 0.4 | 0.4 | 0.4 | 0.4 | 0.4 |
| Water | | Rest | Rest | Rest | Rest | Rest | Rest |
| Total | | 100 | 100 | 100 | 100 | 100 | 100 |

TABLE 5

| Cyan ink | | | I-A |
|---|---|---|---|
| Blending | Cyan pigment dispersion | LC-1 | 5 |
| amount [part] | Binder | B1 | 3 |
| | Propylene glycol | | 25 |
| | Butyl triglycol | | 8 |
| | Surfactant | | 0.4 |
| | Water | | Rest |
| | Total | | 100 |

The terms in Table 3 to 5 and Table 7 described later are as follows.

Part: parts by mass

Surfactant: silicone surfactant ("SILFACE SAG 502A", product of Nissin Chemical Industry Co., Ltd.)

Blending amount: blending amount of corresponding component Where the corresponding component is a binder, the blending amount of the binder indicates a blending amount of the non-volatile content (solid content) of the binder.

Rest: remaining amount, that is, the amount that gives a corresponding ink 100 parts by mass -: no containment of a corresponding component (Production of White Ink (I-1))

Components were charged into a vessel to give the blending amounts in a white ink the blending amounts shown in the column titled White ink (I-1) in Table 3. The vessel contents were stirred and mixed uniformly at a rotational speed of 400 rpm using a stirrer ("THREE-ONE MOTOR BL-600", product of Shinto Scientific Co., Ltd.). The resultant mixed liquid was filtered using a filter with a pore size of 5 μm to remove foreign matter and coarse particles from the mixed liquid. As a result, a white ink (I-1) was obtained.

(Production of White Inks (I-2) to (I-12))

White inks (I-2) to (I-12) were each produced according to the same method as that for producing the white ink (I-1) in all aspects other than that components were charged into a vessel to give the blending amounts of the white ink the blending amounts shown in a corresponding one of the columns titled White inks (I-2) to (I-12) in Tables 3 and 4.

(Production of Cyan Ink (I-A))

A cyan ink (I-A) was produced according to the same method as that for producing the white ink (I-1) in all aspects other than that components were charged into a vessel to give the blending amounts in the cyan ink the blending amounts shown in the column titled Cyan ink (I-A) in Table 5.

[Measurement in Study 1]

The 60 degree gloss of a dried coating film of each of the white inks (I-1) to (I-12) being the first inks was measured by the following method. The measurement results are shown in Table 6 described later.

<Evaluation Apparatus>

As an evaluation apparatus, an inkjet recording apparatus of one path type including a first recording head and a second recording head was used. Piezo inkjet heads ("KJ4B-HD06MHG-STDV", product of KYOCERA Corporation) of line scan type were used as the first recording head and the second recording head. Printing conditions set for the evaluation apparatus included a voltage applied to the recording heads of 21 V, a drive frequency of 20 kHz, an ejection amount per pixel of 3 pL, a temperature of the recording heads of 32° C., a resolution of the recording heads of 1200 dpi, and a number of times of flushing before ejection of 1000 times. The conveyor belt of the evaluation apparatus was pre-heated to 40° C., and the speed of the conveyor belt (recording medium conveyance speed) was set to 30 m/min. A white ink (more specifically, any of the white inks (I-1) to (I-12)) being the first ink was charged into the first recording head of the evaluation apparatus. The cyan ink (I-A) being the second ink was charged into the second recording head of the evaluation apparatus.

<60 Degree Gloss Measurement>

Using the evaluation apparatus, a first ink solid image (size: 50 mm×100 mm) was printed on a non-absorbent recording medium ("LUMIRROR (registered Japanese trademark) #50-S10", product of Toray Industries, Inc., PET film). The non-absorbent recording medium with the first ink solid image printed thereon was dried at 80° C. for 120 seconds using a hot air dryer. Thus, a measurement recording medium (1A) with the first ink solid image printed thereon was obtained. The 60 degree gloss of the first ink solid image (corresponding to a dried coating film of the first ink) printed on the measurement recording medium (1A) was measured under a condition of an incident angle of 60 degrees using a gloss meter ("ELECOMETER J480T", product of Elecometer). Note that the gloss meter was compliant with the Japanese Industrial Standards (JIS) K 5600-4-7:1999.

[Evaluation in Study 1]

Scratch resistance and image quality were evaluated by the following methods using the white inks (I-1) to (I-12) each as the first ink and the cyan ink (I-A) as the second ink. The evaluation results are shown in Table 6 described later.

<Image Quality of Second Ink>

Using the aforementioned evaluation apparatus, a second ink image (image of 14 thin lines) was printed on the solid image on the measurement recording medium (1A) obtained in "60 Degree Gloss Measurement" described above. The difference in line width (misdirection at the edges of the lines) of the printed thin lines was checked. Whether or not each constant line width image has been printed was evaluated as image quality of the second ink according to the following criteria. Cases rated as A or B in the evaluation were determined to be passed, and cases rated as C were determined to be failed.

(Criteria of Image Quality of Second Ink)

A: difference between maximum line width value and minimum line width value of less than 3%

B: difference between maximum line width value and minimum line width value of at least 3% and less than 10%

C: difference between maximum line width value and minimum line width value of 10% or more <Scratch Resistance of First Ink to Non-Absorbent Recording Medium>

Using a bar coater (#02), a first ink (any of the white inks (I-1) to (I-12)) was applied onto a non-absorbent recording medium ("LUMIRROR (registered Japanese trademark) #50-S10", product of Toray Industries, Inc., PET film). The non-absorbent recording medium with the first ink applied thereto was dried at 80° C. for 2 minutes to form a dried coating film (first ink film) of the first ink with a thickness of 6 μm on the entirety of the non-absorbent recording medium. The non-absorbent recording medium with the dried coating film of the first ink formed thereon was used as an evaluation recording medium (1B).

A weight with a load of 1000 g was placed on the dried coating film of the first ink on the evaluation recording medium (1B). Using the weight, the dried coating film of the first ink on the evaluation recording medium (1B) was rubbed one time to apply the dead weight of the weight. The rubbed dried coating film of the first ink was observed with the naked eye to confirm the ratio (peeling area ratio) of the area of an area of the dried coating film of the first ink where the dried coating film of the first ink has been peeled to the entire area thereof. When there were a plurality of areas where the dried coating film of the first ink has been peeled, the ratio of the total of the areas of the areas where the dried coating film of the first ink has been peeled in the entire area of the dried coating film of the first ink was taken to be the peeling area ratio. Scratch resistance of the first ink to the non-absorbent recording medium was evaluated according to the following criteria. Cases rated as A or B in the evaluation were determined to be passed, and cases rated as C or D were determined to be failed.

(Criteria of Scratch Resistance of First Ink to Non-Absorbent Recording Medium)

A: pealing area ratio of 0%

B: pealing area ratio of greater than 0% and no greater than 5%

C: pealing area ratio of greater than 5% and no greater than 10%

D: pealing area ratio of 10% or more

TABLE 6

| | Ink set | First ink | Second ink | Glossi-ness | First ink scratch resistance | Second ink image quality |
|---|---|---|---|---|---|---|
| Example 1-1 | S-A1 | I-1 | I-A | 98 | A | A |
| Example 1-2 | S-A2 | I-2 | I-A | 93 | A | A |
| Example 1-3 | S-A3 | I-3 | I-A | 94 | A | A |
| Example 1-4 | S-A4 | I-4 | I-A | 89 | A | A |
| Example 1-5 | S-A5 | I-5 | I-A | 78 | A | B |
| Example 1-6 | S-A6 | I-6 | I-A | 74 | A | B |
| Example 1-7 | S-A7 | I-7 | I-A | 72 | A | B |
| Example 1-8 | S-A8 | I-8 | I-A | 73 | A | B |
| Comparative Example 1-1 | S-B1 | I-9 | I-A | 13 | A | C (NG) |
| Comparative Example 1-2 | S-B2 | I-10 | I-A | 15 | A | C (NG) |
| Comparative Example 1-3 | S-B3 | I-11 | I-A | 16 | A | C (NG) |
| Comparative Example 1-4 | S-B4 | I-12 | I-A | 13 | A | C (NG) |

In Table 6 and Table 8 described later, "NG" is indicated beside the evaluation result only for each case determined to be failed. The terms in Table 6 and Table 8 described later are as follows.

Glossiness: 60 degree gloss of dried coating film of first ink

First ink scratch resistance: evaluation of scratch resistance of first ink to non-absorbent recording medium Second ink image quality: evaluation of image quality of second ink Ink sets (S-B1) to (S-B4) each included a first ink (more specifically, any of the first inks (I-9) to (I-12)) and a second ink (more specifically, the cyan ink (I-A)). The first pigment particles (more specifically, either the white pigment (KRONOS 2225) or the white pigment (KRONOS 4045)) contained in any of the first inks (I-9) to (I-12) were not the flat titanium pigment particles. As shown in Table 6, the ink sets (S-B1) to (S-B4) were rated as failed in the evaluation of image quality of the second ink and did not print constant line width images.

By contrast, the ink sets (S-A1) to (S-A8) each included a first ink (more specifically, any of the white inks (I-1) to (I-8)) and a second ink (more specifically, the cyan ink (I-A)). The first pigment particles (more specifically, any of the white pigments (JR-804), (JR-806), (CR-50), and (CR-50-2)) contained in any of the white inks (I-1) to (I-8) were the flat titanium pigment particles. The first binder (more specifically, the binder (B1)) contained in each of the white inks (I-1) to (I-8) had a Young's modulus of at least 600 $N/m^2$ and no greater than 1600 $N/mm^2$. As shown in Table 6, the ink sets (S-A1) to (S-A8) were rated as passed in both the evaluation of image quality of the second ink and the evaluation of scratch resistance of the first ink to the non-absorbent recording medium.

[Study 2: Young's Modulus of First Binder]

Next, the Young's modulus of the first binder contained in the first ink was studied.

[Production of Inks Used in Study 2]

White inks (I-13) to (I-15) for use in Study 2 were produced by the following method. Compositions of these white inks are shown in Table 7. Note that the white ink (I-1) shown in Table 3 is shown also in Table 7 for the sake of easy understanding.

TABLE 7

| White ink | | | I-1 | I-13 | I-14 | I-15 |
|---|---|---|---|---|---|---|
| Blending amount [part] | White pigment dispersion | LW-1 | 13 | 13 | 13 | 13 |
| | Binder | B1 | 3 | — | — | — |
| | | B2 | — | 3 | — | — |
| | | B3 | — | — | 3 | — |
| | | B4 | — | — | — | 3 |
| | Propylene glycol | | 25 | 25 | 25 | 25 |
| | Butyl triglycol | | 8 | 8 | 8 | 8 |
| | Surfactant | | 0.4 | 0.4 | 0.4 | 0.4 |
| | Water | | Rest | Rest | Rest | Rest |
| | Total | | 100 | 100 | 100 | 100 |

(Production of White Inks (I-13) to (I-15))

The white inks (I-13) to (I-15) were each produced according to the same method as that for producing the white ink (I-1) in Study 1 in all aspects other than that the components were charged into a vessel to give the blending amounts of the white ink the blending amounts shown in a corresponding one of the columns titled White inks (I-13) to (I-15) in Table 7.

[Measurement in Study 2]

The 60 degree gloss of the dried coating film of each of the white inks (I-13) to (I-15) being the first inks was measured according to the same method as that described in "Measurement in Study 1". The measurement results are shown in Table 8 described later. Note that the 60 degree gloss of the dried coating film of the white ink (I-1) shown in Table 6 is shown also in Table 8 for the sake of easy understanding.

[Evaluation in Study 2]

Using the white inks (I-1) and (I-13) to (I-15) each as the first ink, and the cyan ink (I-A) as the second ink, scratch resistance and image quality were evaluated according to the same methods as those described above in "Evaluation in Study 1". The evaluation results are shown in Table 8. Note that the white ink (I-1) shown in Table 6 is shown also in Table 8 as Example 2-1 for the sake of easy understanding.

TABLE 8

| | Ink set | First ink | Second ink | Glossi-ness | First ink scratch resistance | Second ink image quality |
|---|---|---|---|---|---|---|
| Example 2-1 | S-A1 | I-1 | I-A | 98 | A | A |
| Example 2-2 | S-A9 | I-13 | I-A | 96 | A | A |
| Comparative Example 2-1 | S-B5 | I-14 | I-A | 97 | D (NG) | A |
| Comparative Example 2-2 | S-B6 | I-15 | I-A | 95 | D (NG) | A |

Ink sets (S-B5) and (S-B6) each included a first ink (more specifically, either the first ink (I-14) or (I-15)) and a second ink (more specifically, the cyan ink (I-A)). The first binder (more specifically, either the binder (B3) or (B4)) contained in either the white ink (I-14) or (I-15) had a Young's modulus of less than 600 $N/mm^2$. As shown in Table 8, the ink sets (S-B5) and (S-B6) were rated as failed in the evaluation of scratch resistance of the first ink to the non-absorbent recording medium.

By contrast, the ink sets (S-A1) and (S-A9) each included a first ink (more specifically, either the white ink (I-1) or (I-13)) and a second ink (more specifically, the cyan ink (I-A)). The first pigment particles (more specifically, the white pigment (JR-804)) contained in the white inks (I-1) and (I-13) were the flat titanium pigment particles. The first binder (more specifically, either the binder (B1) or (B2))

contained in either the white ink (I-1) or (I-13) had a Young's modulus of at least 600 N/mm² and no greater than 1600 N/mm². As shown in Table 8, the ink sets (S-A1) and (S-A9) were rated as passed in both the evaluation of image quality of the second ink and the evaluation of scratch resistance of the first ink to the non-absorbent recording medium.

From the above, it is determined that the ink set according to the present disclosure, which encompasses the ink sets (S-A1) to (S-A9), can print constant line width images with excellent scratch resistance on the non-absorbent recording medium.

Also, the inkjet recording apparatus and the inkjet recording method according to the present disclosure that use an ink set such as above can achieve printing of constant line width images on the non-absorbent recording medium. Note that the first ink and the second ink were applied onto the non-absorbent recording medium using a bar coater in the evaluation of scratch resistance of the first ink to the non-absorbent recording medium. While at the same time, it can be determined that the inkjet recording apparatus and the inkjet recording method according to the present disclosure that use an ink set such as above can achieve printing of images with excellent scratch resistance on the non-absorbent recording medium since it is thought that use of the first ink, the second ink, and the non-absorbent recording medium can provide similar advantages, even though the application method is different.

What is claimed is:

1. An inkjet ink set comprising:
a first ink; and
a second ink, wherein
the first ink contains first pigment particles, a first binder, and a first aqueous medium,
the second ink contains second pigment particles, a second binder, and a second aqueous medium,
the first pigment particles each include a titanium pigment particle in a flat shape,
the first binder has a Young's modulus of at least 600 N/mm² and no greater than 1600 N/mm², and
a dried coating film of the first ink has a 60 degree gloss of at least 50 and no greater than 100.

2. The inkjet ink set according to claim 1, wherein
a ratio t/R of a number average t of thicknesses of the titanium pigment particles in the flat shape to a number average R of maximum diameters thereof is no greater than 0.75.

3. The inkjet ink set according to claim 1, wherein
the first binder is a polyurethane with a Young's modulus of at least 1000 N/mm² and no greater than 1600 N/mm², and
the second binder is a polyurethane with a Young's modulus of at least 350 N/mm² and no greater than 1000 N/mm².

4. The inkjet ink set according to claim 1, wherein
the first binder is a polyurethane including a repeating unit derived from an aromatic isocyanate, and
the second binder is a non-yellowing polyurethane.

5. The inkjet ink set according to claim 1, wherein
the first ink is a white ink.

6. The inkjet ink set according to claim 1, wherein
the first ink is an ink for printing a background image, and
the second ink is an ink to be ejected toward the background image.

7. The inkjet ink set according to claim 1, wherein
the first ink and the second ink are used for printing on a non-absorbent recording medium.

8. An inkjet ink set comprising:
a first ink; and
a second ink, wherein
the first ink contains first pigment particles, a first binder, and a first aqueous medium,
the second ink contains second pigment particles, a second binder, and a second aqueous medium,
the first pigment particles each include a titanium pigment particle in a flat shape,
the first binder is a polyurethane with a Young's modulus of at least 1000 N/mm² and no greater than 1600 N/mm², and
the second binder is a polyurethane with a Young's modulus of at least 350 N/mm² and no greater than 1000 N/mm².

9. The inkjet ink set according to claim 8, wherein
a dried coating film of the first ink has a 60 degree gloss of at least 50 and no greater than 100.

10. The inkjet ink set according to claim 8, wherein
a ratio t/R of a number average t of thicknesses of the titanium pigment particles in the flat shape to a number average R of maximum diameters thereof is no greater than 0.75.

11. The inkjet ink set according to claim 8, wherein
the first binder is a polyurethane including a repeating unit derived from an aromatic isocyanate, and
the second binder is a non-yellowing polyurethane.

12. The inkjet ink set according to claim 8, wherein
the first ink is a white ink.

13. The inkjet ink set according to claim 8, wherein
the first ink is an ink for printing a background image, and
the second ink is an ink to be ejected toward the background image.

14. An inkjet ink set comprising:
a first ink; and
a second ink, wherein
the first ink contains first pigment particles, a first binder, and a first aqueous medium,
the second ink contains second pigment particles, a second binder, and a second aqueous medium,
the first pigment particles each include a titanium pigment particle in a flat shape, and
the first binder has a Young's modulus of at least 600 N/mm² and no greater than 1600 N/mm²,
the first binder is a polyurethane including a repeating unit derived from an aromatic isocyanate, and
the second binder is a non-yellowing polyurethane.

15. The inkjet ink set according to claim 14, wherein
a dried coating film of the first ink has a 60 degree gloss of at least 50 and no greater than 100.

16. The inkjet ink set according to claim 14, wherein
a ratio t/R of a number average t of thicknesses of the titanium pigment particles in the flat shape to a number average R of maximum diameters thereof is no greater than 0.75.

17. The inkjet ink set according to claim 14, wherein
the first binder is a polyurethane with a Young's modulus of at least 1000 N/mm² and no greater than 1600 N/mm², and
the second binder is a polyurethane with a Young's modulus of at least 350 N/mm² and no greater than 1000 N/mm².

18. The inkjet ink set according to claim 14, wherein
the first ink is a white ink.

19. The inkjet ink set according to claim 14, wherein the first ink is an ink for printing a background image, and the second ink is an ink to be ejected toward the background image.

* * * * *